United States Patent
Bassmann

(10) Patent No.: US 9,410,726 B2
(45) Date of Patent: Aug. 9, 2016

(54) VALVE DEVICE, IN PARTICULAR FOR A REFRIGERATING MACHINE

(75) Inventor: Stefan Bassmann, Giengen (DE)

(73) Assignee: BSH HAUSGERÄTE GMBH, Munich (DE)

( * ) Notice: Subject to any disclaimer, the term of this patent is extended or adjusted under 35 U.S.C. 154(b) by 180 days.

(21) Appl. No.: 14/240,156

(22) PCT Filed: Aug. 31, 2012

(86) PCT No.: PCT/EP2012/066953
§ 371 (c)(1),
(2), (4) Date: Feb. 21, 2014

(87) PCT Pub. No.: WO2013/030331
PCT Pub. Date: Mar. 7, 2013

(65) Prior Publication Data
US 2014/0190192 A1    Jul. 10, 2014

(30) Foreign Application Priority Data
Sep. 2, 2011    (DE) .......................... 10 2011 082 062

(51) Int. Cl.
*F25B 41/04*    (2006.01)
*F16K 11/074*    (2006.01)
*F25B 41/00*    (2006.01)

(52) U.S. Cl.
CPC .............. *F25B 41/043* (2013.01); *F16K 11/074* (2013.01); *F25B 41/00* (2013.01); *F25B 41/04* (2013.01); *F25B 2600/2511* (2013.01); *Y10T 137/86654* (2015.04)

(58) Field of Classification Search
CPC .................. F25B 41/043; F25B 41/00; F25B 2600/2511; F25B 41/06; F16K 11/074; Y10T 137/06654
See application file for complete search history.

(56) References Cited

U.S. PATENT DOCUMENTS 7,437,888 B2 * 10/2008 Son ........................ F16K 11/074
                                                                    62/527
2007/0084238 A1    4/2007 Son et al.
2007/0137230 A1    6/2007 Bae et al.

FOREIGN PATENT DOCUMENTS

JP    2001-263902    9/2001
JP    2001-325651    11/2001

(Continued)

OTHER PUBLICATIONS

International Search Report issued for PCT/EP2012/066953, mailed Mar. 21, 2013.

(Continued)

*Primary Examiner* — Emmanuel Duke
(74) *Attorney, Agent, or Firm* — Nixon & Vanderhye P.C.

(57) ABSTRACT

The invention relates to a valve device for a refrigerating machine that circulates a refrigerant, include at least one condenser and at least one evaporator. The valve device comprises at least one inlet, at which the refrigerant in the condenser can be fed to the valve device, at least three outlets, through which the refrigerant in the valve device can be discharged into the evaporator, and a valve element, which is rotatably arranged about an axis and can be brought into a plurality of positions. In a first position, the first outlet is connected to the inlet in order to convey refrigerant. In a second position, the second outlet is connected to the inlet in order to convey refrigerant. In a third position, the third outlet is connected to the inlet in order to convey refrigerant.

20 Claims, 6 Drawing Sheets

(56) References Cited

FOREIGN PATENT DOCUMENTS

Figure 2A:
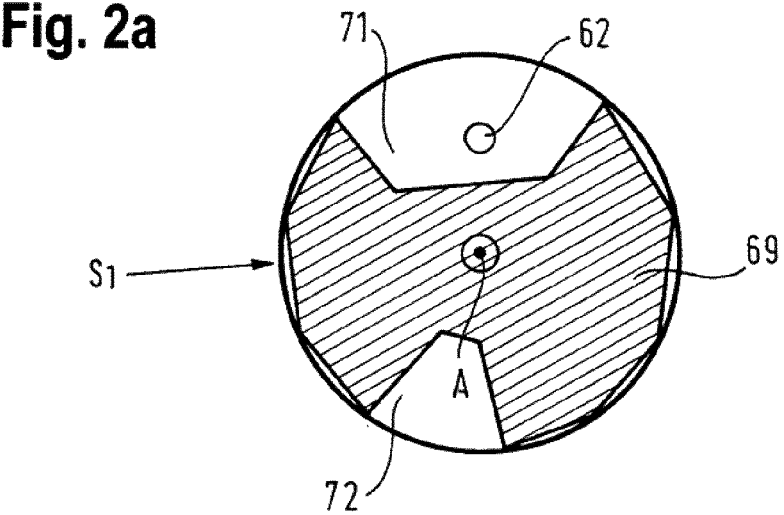

| | | | |
|---|---|---|---|
| JP | 2001325651 A | * | 11/2001 |
| JP | 2005-106315 | | 4/2005 |
| JP | 2005-106373 | | 4/2005 |
| RU | 2144205 C1 | | 1/2000 |
| WO | WO 2011/072685 | | 6/2011 |

OTHER PUBLICATIONS

Foreign-language Written Opinion of the International Searching Authority for PCT/EP2012/066953, mailed Mar. 21, 2013.

* cited by examiner

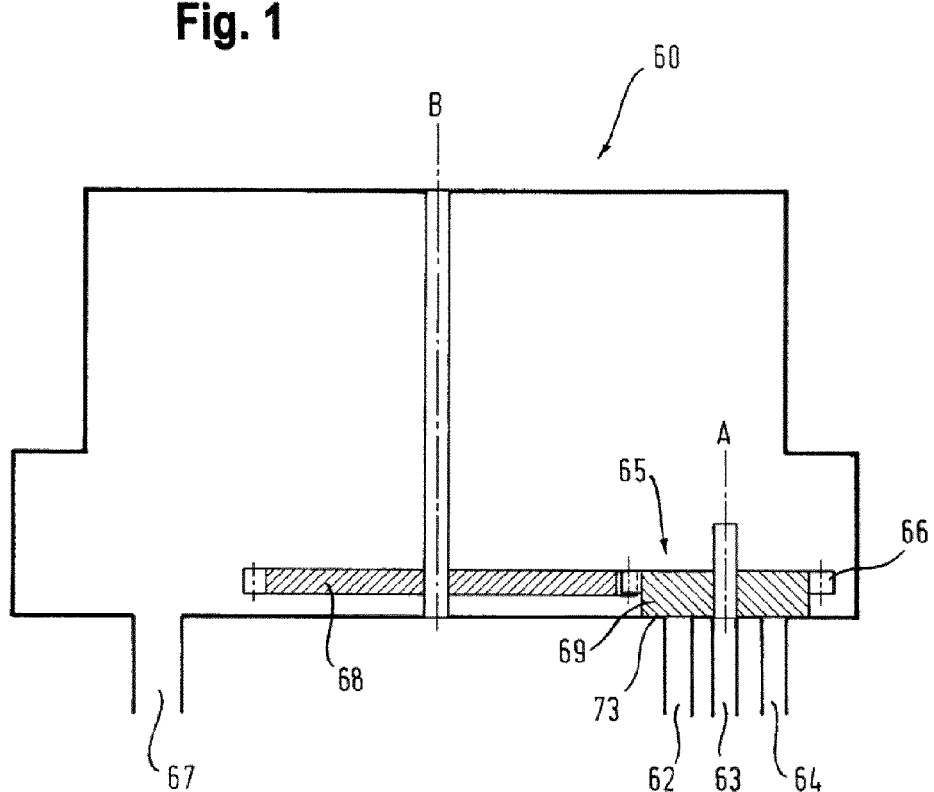

VALVE DEVICE, IN PARTICULAR FOR A REFRIGERATING MACHINE

This application is the U.S. national phase of International Application No. PCT/EP2012/066953, filed 31 Aug. 2012, which designated the U.S. and claims priority to DE Application No. 10 2011 082 062.0, filed 2 Sep. 2011, the entire contents of each of which are hereby incorporated by reference.

The invention relates to a valve device for a refrigerating machine that circulates a refrigerant, which valve device is provided with at least one condenser and at least one evaporator. The valve device comprises at least one inlet, at which the refrigerant in the condenser can be fed to the valve device and at least three outlets, through which the refrigerant in the valve device can be discharged into the evaporator. In addition, the valve device comprises a valve element, which is rotatably arranged about an axis and can be brought into a plurality of positions. In a first position, the first outlet is connected to the inlet in order to convey refrigerant. In a second position, the second outlet is connected to the inlet in order to convey refrigerant. In a third position, the third outlet is connected to the inlet in order to convey refrigerant. In a fourth position, none of the at least three outlets is connected to the inlet.

Such a valve device is known from U.S. Pat. No. 7,437,888 B2.

The object of the invention is to create a valve device which enables a more efficient distribution of refrigerant in a refrigerating machine compared with the valve devices known from the prior art.

To achieve this object a new valve device is proposed. Advantageous embodiments of the valve device according to the invention are described.

To achieve the object, in addition a refrigerating machine and a method for controlling a valve device are proposed. Advantageous embodiments of the refrigerating machine are described.

The refrigerating machine is part of a refrigerating machine in particular. A refrigerating machine is understood to mean in particular a domestic refrigerating machine, in other words a refrigerating machine which is used for household operation in households or possibly also in the catering sector, and in particular serves to store foodstuffs and/or beverages in quantities commensurate with household use at specified temperatures, such as for example a refrigerator, an upright freezer, a refrigerator-freezer combination, a chest freezer or a wine storage appliance.

The valve device according to the invention is characterized in particular in that the refrigerant circulated in the refrigerating machine can be individually distributed according to requirements. By opening two outlets simultaneously, instead of three different options for adjusting the flow of refrigerant between the condenser and evaporator of the refrigerating machine, six different settings are made possible if the valve device has three outlets. In addition, depending on the amount of refrigerant in the condenser, the amount of refrigerant to be discharged can be varied. This is advantageous in particular if extremely high temperatures, for example higher than 70° C., prevail in the condenser. In this context, flow is synonymous with volumetric flow rate.

In a preferred embodiment of the valve device according to the invention the at least three outlets are arranged equidistantly to the axis. This embodiment makes it possible for the different outlets to be released or blocked by means of the same areas of the valve element.

Preferably the at least three outlets are located on a circle, wherein the center of the circle is arranged on the axis, and the outlets are arranged equidistantly in the circumferential direction of the circle. This embodiment has the advantage that the positions of the valve element are transferable to other outlets with regard to each of the three outlets.

In a further preferred embodiment the arrangement of the three outlets is coplanar. Preferably the three outlets are arranged on one plane which runs orthogonally to the axis.

Preferably the valve element comprises an adjusting dial which can preferably be rotated around the axis A by means of a gearwheel which can be driven by a stepping motor. Such a stepping motor is described, for example, in EP 1 176 346 B1. Preferably the valve device has a limit switch which prevents the valve element being able to rotate to its full extent.

Preferably the adjusting dial comprises a panel which is rotationally asymmetrical with regard to the axis. Rotationally asymmetrical means the same as not rotationally symmetrical here. This embodiment makes it possible for the valve element to be operated over a radian measure of approximately 360°, without positions which are offset by 180° respectively bringing about a similar configuration of the connections between the inlet and one or more outlets.

In a preferred embodiment of the valve device according to the invention, the panel comprises at least two recesses which connect the inlet with at least one of the at least three outlets in order to convey refrigerant.

In addition, the valve device according to the invention is preferably characterized by a sixth position and a seventh position, in which in each case at least two of the at least three outlets respectively are connected to the inlet.

In a preferred embodiment at least one position in which none of the at least three outlets is connected to the inlet is arranged between two positions in which at least two of the at least three outlets respectively are connected to the inlet. This embodiment has the advantage that from a position in which two outlets are connected to the inlet, it is possible to rapidly transfer to a state in which all the outlets are closed. Thus, the refrigerant discharge from the condenser can be rapidly interrupted.

The refrigerating machine according to the invention comprises a valve device according to the invention. The refrigerating machine comprises a condenser, an evaporator, a compressor and at least three flow restricting units arranged in parallel which are connected to one of the at least three outlets of the valve device respectively and to the evaporator respectively. This embodiment makes it possible to regulate the volumetric flow rate of the refrigerant conveyed from the condenser into the evaporator by using a single one of the at least three flow restricting units or at the same time two of the at least three flow restricting units in order to discharge refrigerant.

Alternatively, the refrigerating machine may comprise a condenser, at least three evaporators arranged in parallel, a compressor and at least three flow restricting units arranged in parallel, which are connected to one of the at least three outlets of the valve device respectively and one of the at least three evaporators respectively. Preferably the evaporators are each assigned to different temperature zones of the refrigerating machine, enabling several temperature zones to also be cooled down simultaneously by means of the valve device through the supply of refrigerant to the respective evaporators. Therefore, the supply of refrigerant to one evaporator does not mean that the supply of refrigerant for the at least two remaining evaporators has to stop.

Preferably the three flow restricting units have different pressure loss coefficients. The pressure loss coefficient, which can also be described as a drag coefficient or as a flow resistance coefficient, is a dimensionless measure for the flow resistance of a body perfused by a fluid. If the refrigerating machine has evaporators arranged in parallel in numbers commensurate with the number of outlets of the valve device, then the pressure loss coefficients may be selected such that the evaporators are optimally supplied with refrigerant. If a common evaporator is supplied with refrigerant by the flow restricting units, then it is particularly advantageous to select the pressure loss coefficients of the respective flow restricting units in such a way that the volumetric flow rate of transported refrigerant corresponds to that of a single one of the flow restricting units not to the volumetric flow rate of refrigerant of two flow restricting units opened in parallel. For in this way, for example, the three flow restricting units and the three positions at which two flow restricting units are opened in parallel at the same time can bring about a total of six different volume flows, otherwise a maximum of five.

The method according to the invention for controlling a valve device according to the invention comprises the following method steps:

Conveyance of refrigerant from the inlet to the first outlet in a first position;
Conveyance of refrigerant from the inlet to the second outlet in the second position;
Conveyance of refrigerant from the inlet to the third outlet in the third position;
Interruption of the flow of refrigerant in the fourth position and conveyance of refrigerant from the inlet to two of the at least three outlets in the fifth position.

The method according to the invention for controlling a valve device according to the invention utilizes the advantages of the valve device according to the invention.

Figure 2B:
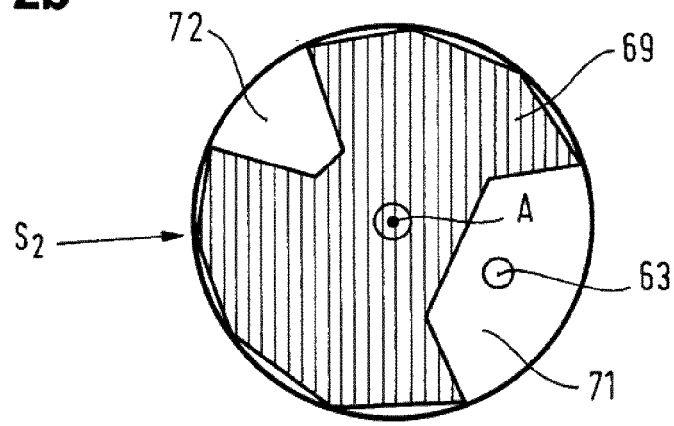
Figure 2C:
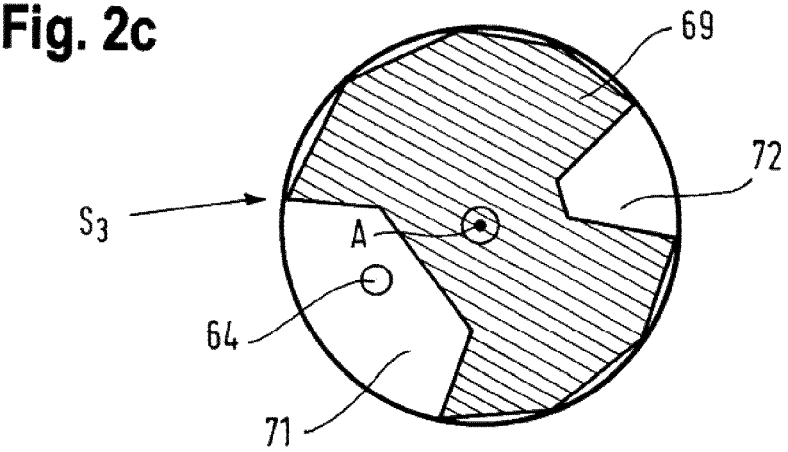
Figure 2D:
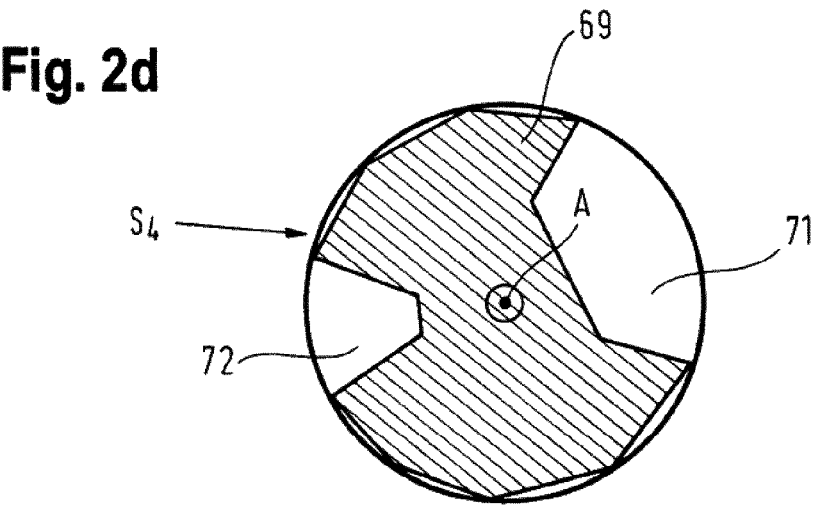
Figure 2E:
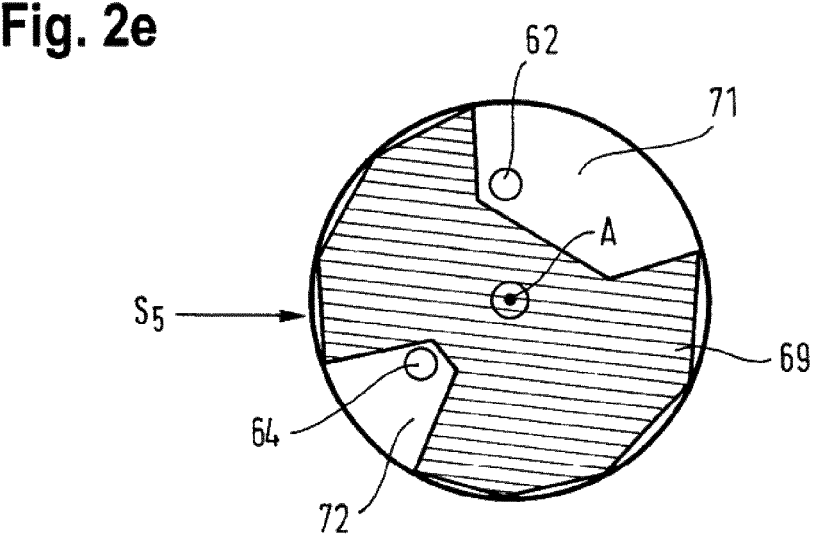
Figure 2F:
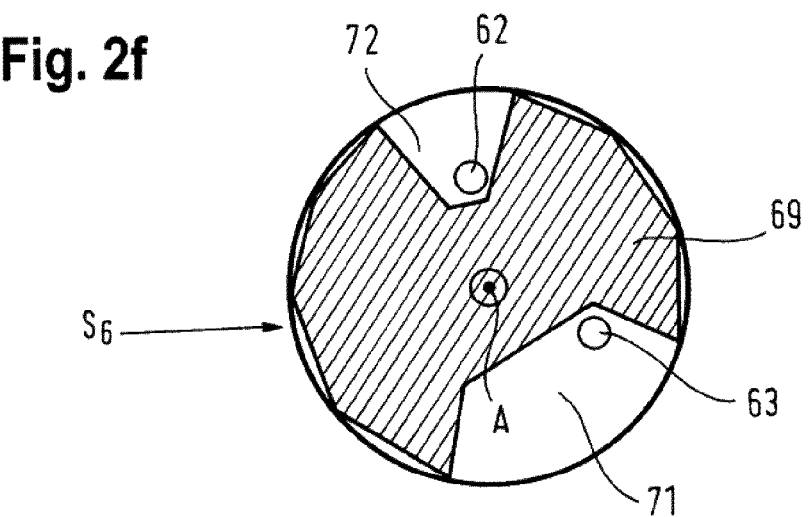
Figure 2G:
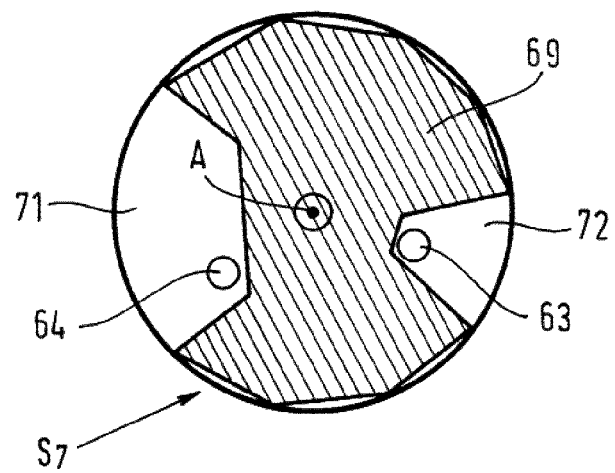
Figure 3:
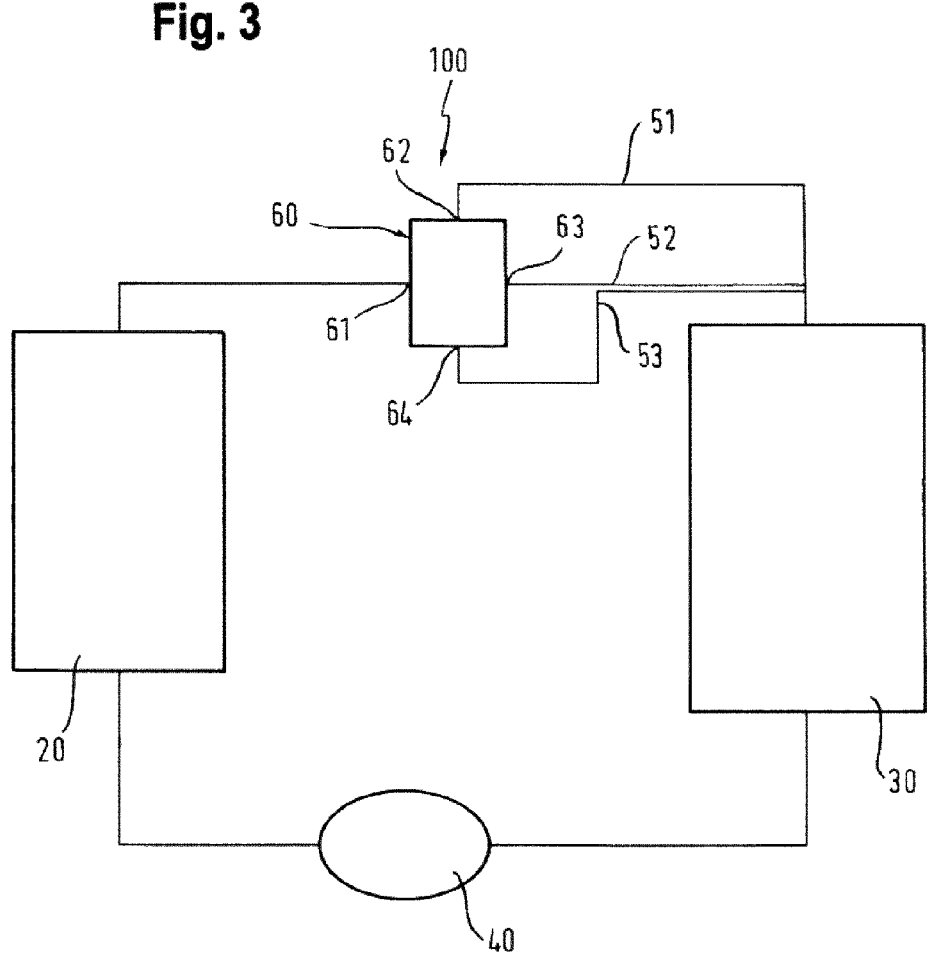
Figure 4:
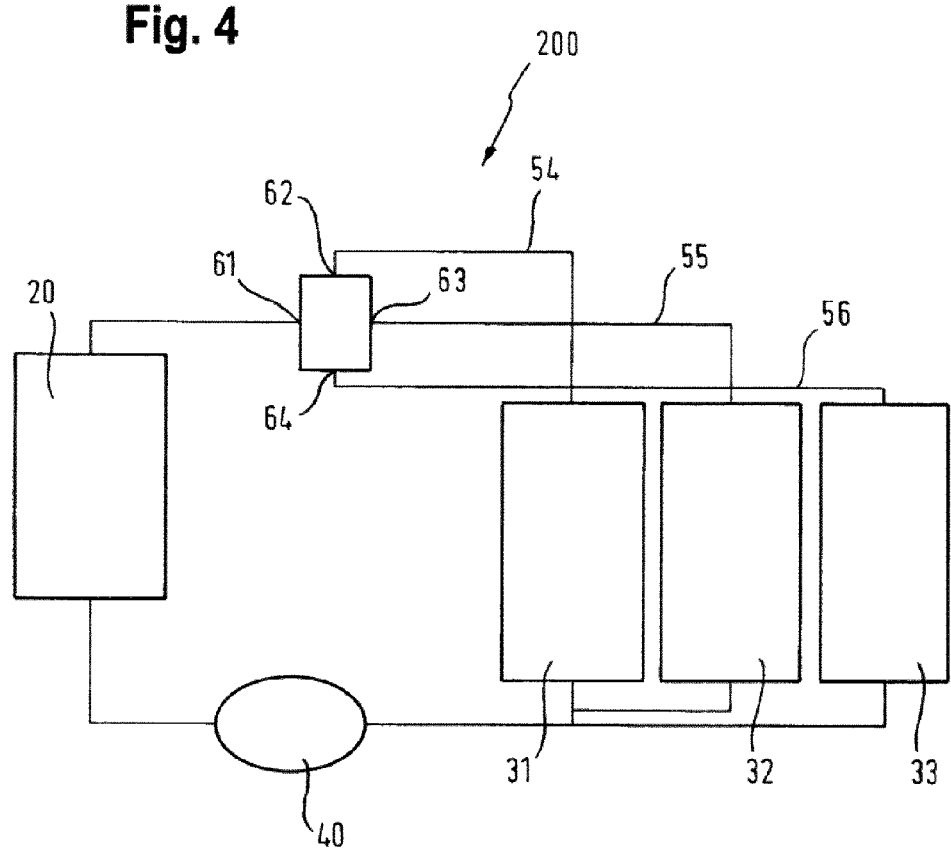

Details and additional advantages of the invention can be found in the preferred exemplary embodiments described below. The drawings only representing the exemplary embodiments schematically illustrate in detail:

FIG. 1: a cross-section of a valve device according to the invention;

FIG. 2a: a cross-section of the panel of a valve device according to the invention in a first position;

FIG. 2b: a cross-section of a panel of a valve device according to the invention in a second position;

FIG. 2c: a cross-section of a panel of a valve device according to the invention in a third position;

FIG. 2d: a cross-section of a panel of a valve device according to the invention in a fourth position;

FIG. 2e: a cross-section of a panel of a valve device according to the invention in a fifth position;

FIG. 2f: a cross-section of a panel of a valve device according to the invention in a fifth position;

FIG. 2g: a cross-section of a panel of a valve device according to the invention in a fifth position;

FIG. 3: a schematic representation of a refrigerating machine according to the invention in accordance with a first exemplary embodiment and FIG. 4: a schematic view of a refrigerating machine according to the invention in accordance with a second exemplary embodiment.

FIG. 1 shows a cross-section of a valve device 60 according to the invention. The valve device 60 comprises a gearwheel 68, which is rotatably arranged about an axis B. A valve element 65 is rotatably arranged about an axis A and comprises an adjusting dial 66 which engages in the gearwheel 68 and is capable of being driven by the gearwheel 68.

In FIG. 1 the axes A, B are inside the cross-sectional plane. In addition, the valve element 60 comprises an inlet 61 and three outlets 62, 63, 64. By means of the inlet 61, refrigerant can be fed to the valve device 60 and can be discharged from the valve device 60 again by means of the outlets 62, 63, 64. The valve element 65 is arranged opposite the outlets 62, 63, 64 in an outlet section 73.

The outlets 62, 63, 64 are arranged equidistantly to the axis A. The panel 69 is in the area of the outlets 62, 63, 64 on the inlet section 73 of the valve device 60. By rotating the gearwheel 68 about the axis B, the valve element 65 is rotated about the axis A. The valve element 65 is prevented from completing a rotation of more than 360° by means of a limit switch (not shown).

FIGS. 2a to 2g show a cross-section of the panel 69 of the valve element 65 along a plane which runs transversely to axis A, wherein each of the figures portrays the panel 69 in another position $S_1$, $S_2$, $S_3$, $S_4$, $S_5$, $S_6$, $S_7$.

FIG. 2a shows a cross-section of the panel 69 of the valve element 65 along a plane running transversely to the axis A in a first position $S_1$. The panel 69 comprises a first recess 71 and a second recess 72 through which the refrigerant can flow from the inlet 61 to the outlets 62, 63, 64. The recesses 71, 72 are rotationally asymmetrical with regard to axis A. Likewise the panel 69 is rotationally asymmetrical with regard to the axis A. As FIG. 2a in particular shows, the first recess 71 is arranged opposite the first outlet 62, whereby the inlet 61 is connected to the first outlet 62. The refrigerant can therefore flow through the valve element 60 by getting from the inlet 61 through the first recess 71 to the first outlet 62. In the first position $S_1$ of the valve element 65 shown in FIG. 2a, the outlets 63, 64 are blocked by the panel 69 of the valve element 65 so that no refrigerant can get from the inlet 61 to the outlets 63, 64.

In a second position $S_2$, which is shown in FIG. 2b, the first recess 71 is arranged opposite the second outlet 63. The outlet 63 is therefore directly connected to the inlet 61. In the second position $S_2$, the first outlet 62 and the third outlet 64 are blocked by the panel 69 of the valve element 65 so that no refrigerant can get from the inlet 61 to the outlets 62, 64.

In a third position $S_3$, which is shown in FIG. 2C, the first recess 71 is arranged opposite the third outlet 64 so that refrigerant can flow from the inlet 61 to the outlet 64. The outlets 62, 63 are blocked by the panel 69 so that a refrigerant flow from the inlet 61 to the outlets 62, 63 is prevented.

FIG. 2d shows a cross-section of the panel 69 of the valve element 65 in a fourth position $S_4$. In the fourth position $S_4$ all three outlets 62, 63, 64 are blocked by the panel 69 so that the refrigerant flow from the inlet 61 to each of the outlets 62, 63, 64 is interrupted.

As shown in FIG. 2e, the panel 69 of the valve element 65 is arranged in a fifth position $S_5$ such that the first recess 71 is located opposite the first outlet 62 and the second recess 72 is located opposite the third outlet 64. By means of this arrangement of the panel 69, both the first outlet 62 and the third outlet 64 are connected to the inlet 61 so that the refrigerant can flow from the inlet 61 to the outlets 62, 64. The second outlet 63 is blocked by the panel 69, however, so that the flow of refrigerant from the inlet 61 to the second outlet 63 is prevented.

As shown in FIG. 2f, the panel 69 of the valve element 65 is arranged in a sixth position $S_6$ such that the first recess 71 is located opposite the second outlet 63 and the second recess 72 is located opposite the first outlet 62. Through this arrangement of the panel 69, both the first outlet 62 and the second outlet 63 are connected to the inlet 61 so that the refrigerant can flow from the inlet 61 to the outlets 62, 63. The third outlet 64 is blocked by the panel 69, however, so that the flow of refrigerant from the inlet 61 to the third outlet 64 is prevented.

As shown in FIG. 2g, the panel 69 of the valve element 65 is arranged in a seventh position $S_7$ such that the first recess 71 is located opposite the third outlet 64 and the second recess 72 is located opposite the second outlet 63. By means of this arrangement of the panel 69, both the second outlet 63 and the third outlet 64 are connected to the inlet 61 so that the refrigerant can flow from the inlet 61 to the outlets 63, 64. The first outlet 62 is blocked by the panel 69, however, so that the flow of refrigerant from the inlet 61 to the first outlet 62 is prevented.

FIG. 3 shows a refrigerating machine 100 according to the invention in accordance with a first exemplary embodiment. The refrigerating machine 100 comprises a condenser 20, an evaporator 30, a compressor 40 as well as a valve device 60 according to the invention and three flow restricting units 51, 52, 53 arranged in parallel. The flow restricting units 51, 52, 53 are connected to one of the outlets 62, 63, 64 of the valve device 60 respectively on the one hand, and to the evaporator 30 on the other hand. A refrigerant is passed through the refrigerating machine 100 and successively undergoes various aggregate state changes. The initially gaseous refrigerant is compressed by the compressor 40 and flows into the condenser 20. In the condenser 20 the refrigerant condenses during heat absorption. Then the refrigerant flows to the valve device 60 according to the invention and is fed by one flow restricting unit 51, 52, 53 or also in parallel by two flow restricting units 51, 52, 53 to the evaporator. In the evaporator 30 the refrigerant evaporates during heat absorption at a relatively low temperature. Now the circulation of the refrigerant in the refrigerating machine 100 can start from the beginning. The refrigerant thus absorbs a heat output at a low temperature and emits it to the surroundings at a higher temperature with the addition of technical work.

The refrigerating machine 100 described above makes it possible for the volumetric flow rate of the refrigerant which is fed by the condenser 20 via the valve device 60 to the evaporator 30 to be regulated. The refrigerating machine 100 according to the invention comprises three flow restricting units 51, 52, 53 which preferably have different pressure loss coefficients. As two of the three outlets 62, 63, 64 of the valve device 60 can also be opened, another three additional valve positions come about in which two of the three flow restricting units 51, 52, 53 respectively are perfused with refrigerant. Thus, another three additional options for different volume flows of refrigerant which can be supplied to the evaporator are brought about. Thus, in connection with the flow restricting units 51, 52, 53, the valve device 60 is able to operate as a multi-level flow restricting unit which can accept six different pressure loss coefficients. Thus, in conjunction with the flow restricting units 51, 52, 53, the valve device 60 is able to operate as a flow restricting unit which can accept six different pressure loss coefficients. The embodiment of the refrigerating machine 100 according to the invention thus enables the refrigerant to be fed at different rates from the condenser 20 into the evaporator 30.

FIG. 4 shows a refrigerating machine 200 according to the invention in accordance with a second exemplary embodiment. The refrigerating machine 200 comprises a condenser 20, three evaporators 31, 32, 33, a compressor 40 and a valve device 60 according to the invention, the outlets 62, 63, 64 of which are connected to one of the evaporators 31, 32, 33 respectively. The outlets 62, 63, 64 are connected to the evaporators 31, 32, 33 via the flow restricting units 54, 55, 56. As the flow restricting units 54, 55, 56 may vary in their pressure loss coefficients, the volumetric flow rate can be adjusted to the refrigeration requirements of the evaporators 31, 32, 33. The evaporators 31, 32, 33 of the refrigerating machine 200 according to the invention may be assigned to different temperature zones with the result that the extent of their cooling capacity may vary greatly. One of the evaporators 31, 32, 33 or two of the evaporators 31, 32, 33 can be simultaneously fed with refrigerant from the condenser as required by means of the embodiment of the valve device according to the invention.

| List of reference characters | |
|---|---|
| 20 | Condenser |
| 30 | Evaporator |
| 31 | Evaporator |
| 32 | Evaporator |
| 33 | Evaporator |
| 40 | Compressor |
| 51 | Flow restricting unit |
| 52 | Flow restricting unit |
| 53 | Flow restricting unit |
| 54 | Flow restricting unit |
| 55 | Flow restricting unit |
| 56 | Flow restricting unit |
| 60 | Valve device |
| 61 | Inlet |
| 62 | First outlet |
| 63 | Second outlet |
| 64 | Third outlet |
| 65 | Valve element |
| 66 | Adjusting dial |
| 68 | Gearwheel |
| 69 | Panel |
| 71 | First recess |
| 72 | Second recess |
| 73 | Outlet section |
| 100 | Refrigerating machine |
| 200 | Refrigerating machine |
| A | Axis |
| B | Axis |
| $S_1$ | First position |
| $S_2$ | Second position |
| $S_3$ | Third position |
| $S_4$ | Fourth position |
| $S_5$ | Fifth position |
| $S_6$ | Sixth position |
| $S_7$ | Seventh position |

The invention claimed is:

1. A valve device for a refrigerating machine that circulates a refrigerant, which the refrigerating machine is provided with at least one condenser and at least one evaporator, the valve device comprising:
at least one inlet, at which the refrigerant in the condenser can be fed to the valve device;
at least three outlets, through which the refrigerant in the valve device can be discharged into the evaporator;
a valve element, which is rotatably arranged about an axis (A) and can be brought into a plurality of positions ($S_1$ $S_2$, $S_3$, $S_4$, $S_5$, $S_6$, $S_7$), the valve element including a rotatable panel having at least first and second recesses each dimensioned to allow communication between the at least one inlet and only a single one of the at least three outlets at any given rotational position of the panel;
wherein in a first position ($S_1$) the first outlet is connected to the inlet in order to convey refrigerant;
wherein in a second position ($S_2$) the second outlet is connected to the inlet in order to convey refrigerant;
wherein in a third position ($S_3$) the third outlet is connected to the inlet in order to convey refrigerant;
wherein in a fourth position ($S_4$) none of the at least three outlets is connected to the inlet and
wherein in a fifth position ($S_5$) at least two of the at least three outlets is connected to the inlet.

2. The valve device as claimed in claim 1, wherein the at least three outlets are arranged equidistantly to the axis (A).

3. The valve device as claimed in claim 1, wherein the at least three outlets are located on a circle, wherein the center of the circle is arranged on the axis (A) and the outlets are arranged equidistantly in the circumferential direction of the circle.

4. The valve device as claimed in claim 1, wherein the valve element comprises an adjusting dial which is preferably rotatable about the axis (A) by means of a gearwheel capable of being driven by a stepping motor.

5. The valve device as claimed in claim 4, wherein the adjusting dial comprises a panel which is rotationally asymmetrical with regard to the axis (A).

6. The valve device as claimed in claim 5, wherein the panel comprises at least two recesses which connects the inlet to at least one of the at least three outlets in order to convey refrigerant.

7. The valve device according to claim 1, further comprising a sixth position ($S_6$) and a seventh position ($S_7$), in which at least two of the at least three outlets respectively are connected to the inlet.

8. The valve device as claimed in claim 1, wherein at least one position ($S_4$) in which none of the at least three outlets is connected to the inlet is arranged between two positions ($S_5$) in which at least two of the at least three outlets are connected to the inlet respectively.

9. A refrigerating machine comprising the valve device as claimed in claim 1.

10. The refrigerating machine as claimed in claim 9, wherein the condenser, an evaporator, a compressor and at least three flow restricting units arranged in parallel which are connected to one of the at least three outlets of the valve device respectively and to the evaporator respectively.

11. The refrigerating machine as claimed in claim 10, wherein the at least three flow restricting units have different pressure loss coefficients.

12. The refrigerating machine as claimed in claim 9, wherein the condenser, at least three evaporators arranged in parallel, a compressor and at least three flow restricting units arranged in parallel which are connected to at least one of the at least three outlets of the valve device respectively and to one of the at least three evaporators respectively.

13. A domestic refrigerating appliance with a refrigerating machine as claimed in claim 9.

14. The valve device as claimed in claim 1, wherein the at least three outlets are substantially equally spaced from one another.

15. The valve device as claimed in claim 14, wherein the at least three outlets are spaced about 120° from one another.

16. The valve device as claimed in claim 1, wherein in the fifth position, the first and second outlets are connected to the inlet, in a sixth position, the first and third outlets are connected to the inlet and in a seventh position, the second and third outlets are connected to the inlet.

17. The valve device as claimed in claim 16, wherein in each of the fifth, sixth and seventh positions, each of the first and second recesses allows communication between the inlet and one of the at least three outlets.

18. The valve device as claimed in claim 1, wherein the first and second recesses are arranged so that the inlet cannot be simultaneously aligned with the first, second and third outlets.

19. A method for controlling a valve device comprising:
conveyance of refrigerant from an inlet to a first outlet in a first position ($S_1$) of a rotatable valve element;
conveyance of refrigerant from the inlet to a second outlet in a second position ($S_2$) of a rotatable valve element;
conveyance of refrigerant from the inlet to a third outlet in the third position ($S_3$);
the rotatable valve element including a rotatable panel having at least first and second recesses each dimensioned to allow communication between the at least one inlet and only a single one of the at least three outlets in any given position of the panel;
interruption of the flow of refrigerant in a fourth position ($S_4$);
and
conveyance of refrigerant from the inlet to two of the first, second and third outlets in a fifth position ($S_5$).

20. The method for controlling the valve device as claimed in claim 19, wherein the panel includes at least first and second blocking portions and wherein, in each of the first, second and third positions the first and second blocking portions block only a single one of the at least three outlets.

* * * * *